(12) United States Patent
Landrum, Jr. et al.

(10) Patent No.: US 8,419,023 B1
(45) Date of Patent: Apr. 16, 2013

(54) TRASH CARRYALL WITH REMOVABLE CYLINDER

(76) Inventors: George W. Landrum, Jr., Strasburg, CO (US); Alberta LeBlanc, Strasburg, CO (US)

( * ) Notice: Subject to any disclaimer, the term of this patent is extended or adjusted under 35 U.S.C. 154(b) by 92 days.

(21) Appl. No.: 13/223,549

(22) Filed: Sep. 1, 2011

(51) Int. Cl.
B62B 1/00 (2006.01)

(52) U.S. Cl.
USPC ............... 280/47.23; 280/47.26; 280/79.2; 280/79.5

(58) Field of Classification Search .............. None
See application file for complete search history.

(56) References Cited

U.S. PATENT DOCUMENTS

| | | | | |
|---|---|---|---|---|
| D134,941 S | * | 2/1943 | Hansen | D34/24 |
| 3,927,786 A | | 12/1975 | Aboud | |
| 4,383,695 A | * | 5/1983 | Ray | 280/47.26 |
| 4,411,344 A | * | 10/1983 | Walker | 190/18 A |
| 4,650,200 A | * | 3/1987 | Berfield et al. | 280/47.26 |
| D304,631 S | * | 11/1989 | McCarville | D34/5 |
| 5,040,811 A | * | 8/1991 | Busken et al. | 280/47.34 |
| 5,197,754 A | * | 3/1993 | Ward | 280/655 |
| D334,640 S | * | 4/1993 | Forish | D34/24 |
| D393,131 S | * | 3/1998 | Scandalis | D34/24 |
| 5,758,888 A | | 6/1998 | Burgan et al. | |
| D408,952 S | * | 4/1999 | Page | D34/25 |
| D436,705 S | * | 1/2001 | Dow et al. | D34/5 |
| 6,220,610 B1 | * | 4/2001 | Cox | 280/47.19 |
| 6,666,465 B2 | * | 12/2003 | Chan | 280/47.26 |
| D525,758 S | * | 7/2006 | Lynch | D34/12 |
| 7,108,150 B1 | | 9/2006 | Rouse et al. | |
| 7,380,682 B2 | | 6/2008 | Lin | |
| D642,764 S | * | 8/2011 | Elden | D34/24 |
| 8,191,908 B2 | * | 6/2012 | Udall et al. | 280/47.26 |
| 2003/0034636 A1 | * | 2/2003 | Ng | 280/652 |

* cited by examiner

Primary Examiner — Jeffrey J Restifo
Assistant Examiner — Erez Gurari

(57) ABSTRACT

A trash carryall with removable cylinder that includes a wheeled carryall operable independent of a removable cylinder, said cylinder insertable into the carryall and securable therein by means of a first and a second hole disposed within the carryall which superimpose a left and a right hole respectively, said left and right hole disposed within the removable cylinder, to store and transport trash, and other household items common to the yard; which cylinder is removable as preferred to readily access trash and items stored proximal a base of the carryall without upending the device.

4 Claims, 5 Drawing Sheets

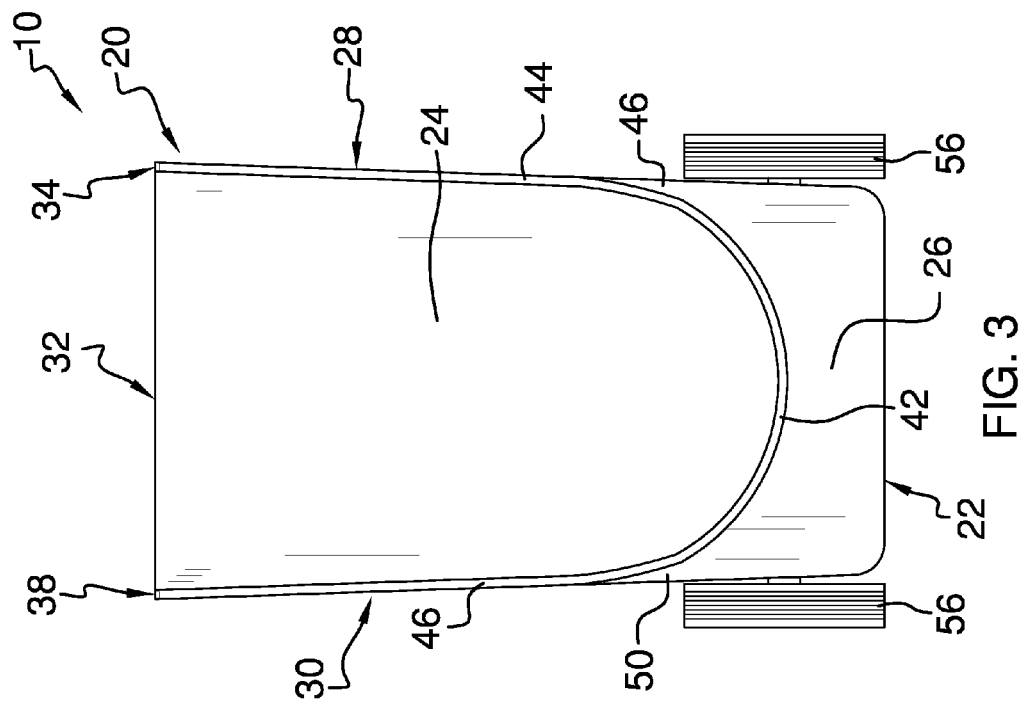
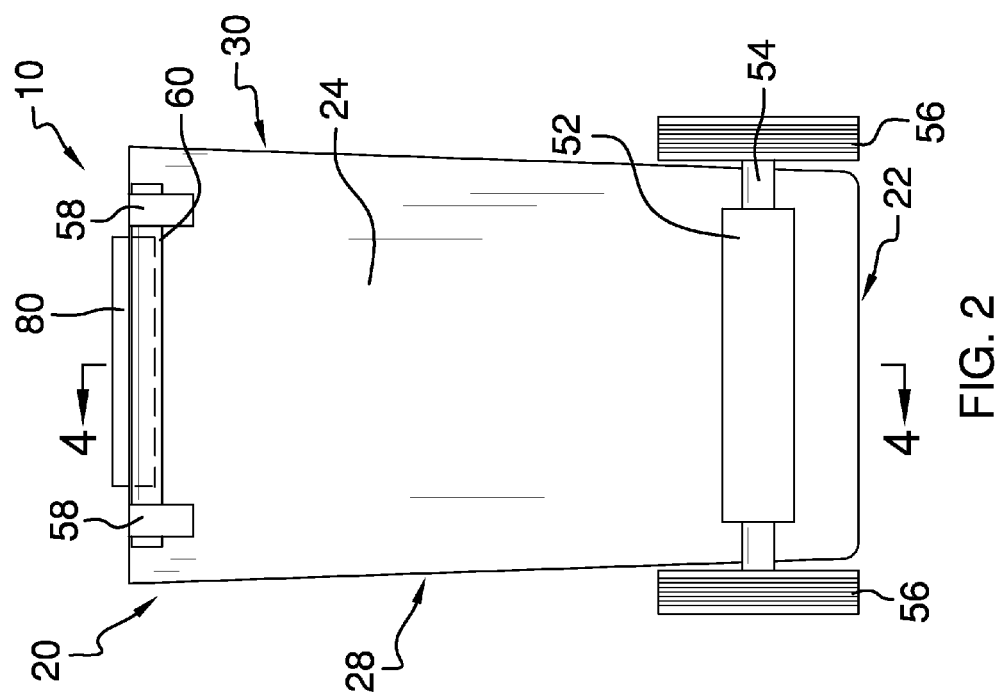

TRASH CARRYALL WITH REMOVABLE CYLINDER

BACKGROUND OF THE INVENTION

Various types of trash carryall with removable cylinders are known in the prior art. However, what is needed is a trash carryall with removable cylinder that includes a wheeled carryall operable independent of a removable cylinder, said cylinder insertable into the carryall whereby trash stored in the trash carryall with removable cylinder may be readily accessed by removing the removable cylinder.

FIELD OF THE INVENTION

The present invention relates to a trash carryall with removable cylinder, and more particularly, to a trash carryall with removable cylinder that includes a wheeled carryall operable independent of a removable cylinder, said cylinder insertable into the carryall, whereby trash stored in the trash carryall with removable cylinder may be readily accessed by removing the removable cylinder.

SUMMARY OF THE INVENTION

The general purpose of the trash carryall with removable cylinder, described subsequently in greater detail, is to provide a trash carryall with removable cylinder which has many novel features that result in a trash carryall with removable cylinder which is not anticipated, rendered obvious, suggested, or even implied by prior art, either alone or in common cylinderation thereof.

Storage of trash is a ready need present in every household. Further, barrows and other transporting devices are useful to have in the home or garden, by which to move a multitude of objects. The present device offers the convenience of a trash receptacle and an all purpose carryall for multiple use around the home. Moreover, the present device provides a more easy access to trash stored in the bottom of the device.

The present trash carryall with removable cylinder includes a wheeled carryall having a square base, a front side, a left side, a right side, and a back side. A horizontal edge tops the front side. A parabolic left edge is disposed from a left side front portion down across the left side, to adjoin a back edge. A parabolic right edge is enantiomorphically disposed from a right side forward portion down across the right side to join with the back edge. When viewed from the rear, these first parabolic, second parabolic, and back edges delimit a parabolic section removed from the carryall.

A removable cylinder is insertable into this carryall, the removable cylinder configured to fit removably into the carryall. This cylinder has a lip disposed from an open top, which lip readily engages with the horizontal edge when the cylinder is inserted into the carryall. This lip releasably secures the cylinder within the carryall. The cylinder is further secured within the carryall by means of a first and second hole disposed in the carryall which both superimpose with each of a left and a right hole respectively, said left and right hole disposed in a corresponding position upon the removable cylinder left and right walls, when the cylinder is placed within the carryall. These holes are configured to receive a pair of extant fasteners therethrough, such as a wing nut or bolt, which may releasably secure the cylinder within the carryall. Thusly, the cylinder may be inserted into the carryall, and the trash carryall with removable cylinder utilized as a single unit.

The removable cylinder has an open bottom. When emptying the trash carryall with removable cylinder, trash bags stored in the bottom of the device may be more easily accessed by simply removing the cylinder, and sliding the cylinder up and out of the wheeled carryall. Trash that would otherwise require emptying by upending the device is now readily accessible.

The instant trash carryall with removable cylinder is moveable by means of a pair of wheels disposed endwise on an axle, said axle disposed through a wheel brace disposed on the carryall front side proximal to the square base. Thusly, when the trash carryall with removable cylinder is tipped forward, the wheels are engaged with the ground, the axle bares the weight of the device and any contents, and the device is thereby moveable by means of a handle disposed on the front wall proximal to the open top. The device may be wheeled about as desired with or without the removable cylinder inserted into the carryall.

Thus has been broadly outlined the more important features of the present trash carryall with removable cylinder so that the detailed description thereof that follows may be better understood and in order that the present contribution to the art may be better appreciated.

Objects of the present trash carryall with removable cylinder, along with various novel features that characterize the invention are particularly pointed out in the claims forming a part of this disclosure. For better understanding of the trash carryall with removable cylinder, its operating advantages and specific objects attained by its uses, refer to the accompanying drawings and description.

BRIEF DESCRIPTION OF THE DRAWINGS

Figures

FIG. 2 is a front view.

FIG. 3 is a back view.

DETAILED DESCRIPTION OF THE DRAWINGS

Figure 1:
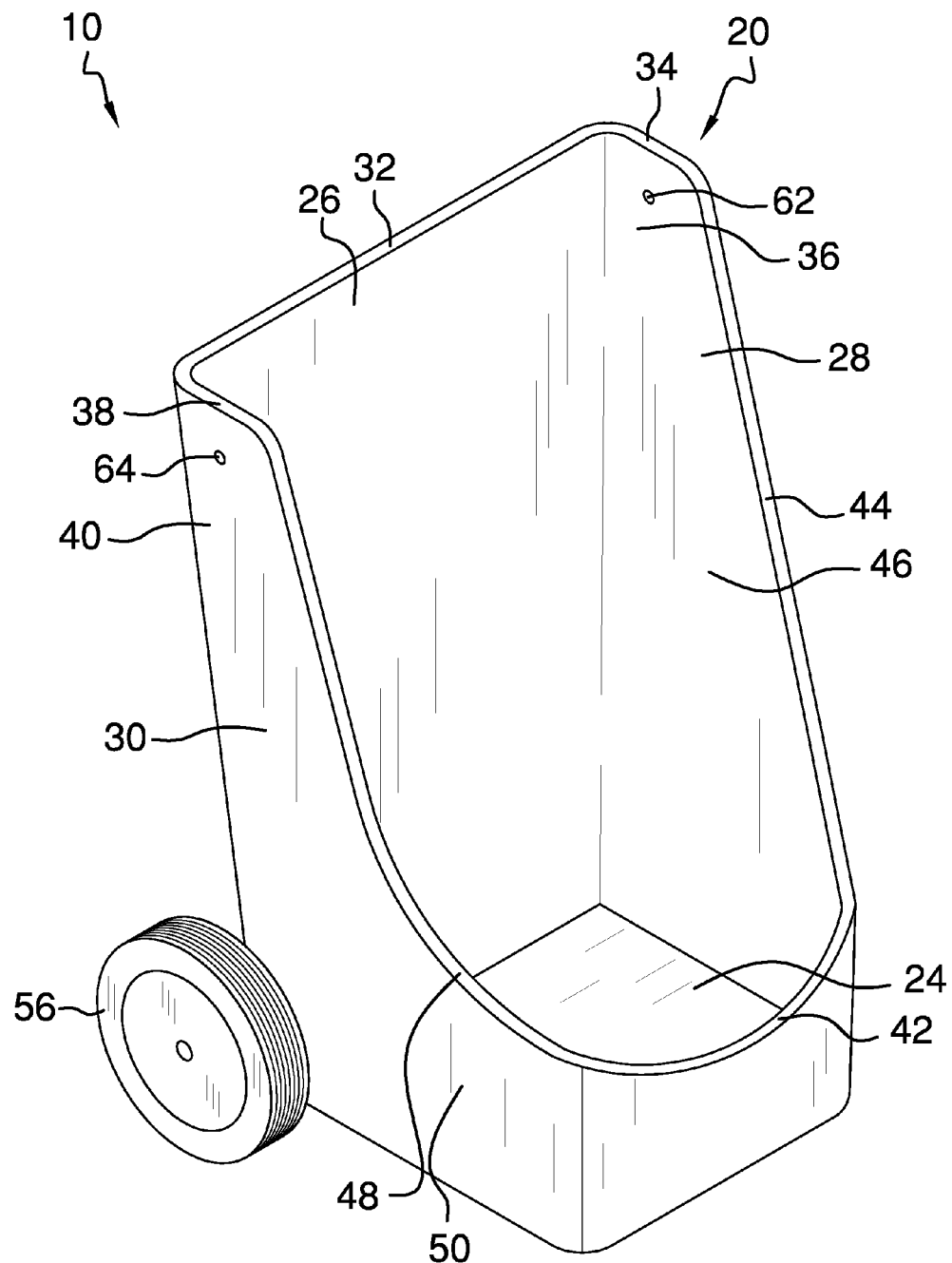
FIG. 1 is an isometric view of a wheeled carryall.
Figure 4:
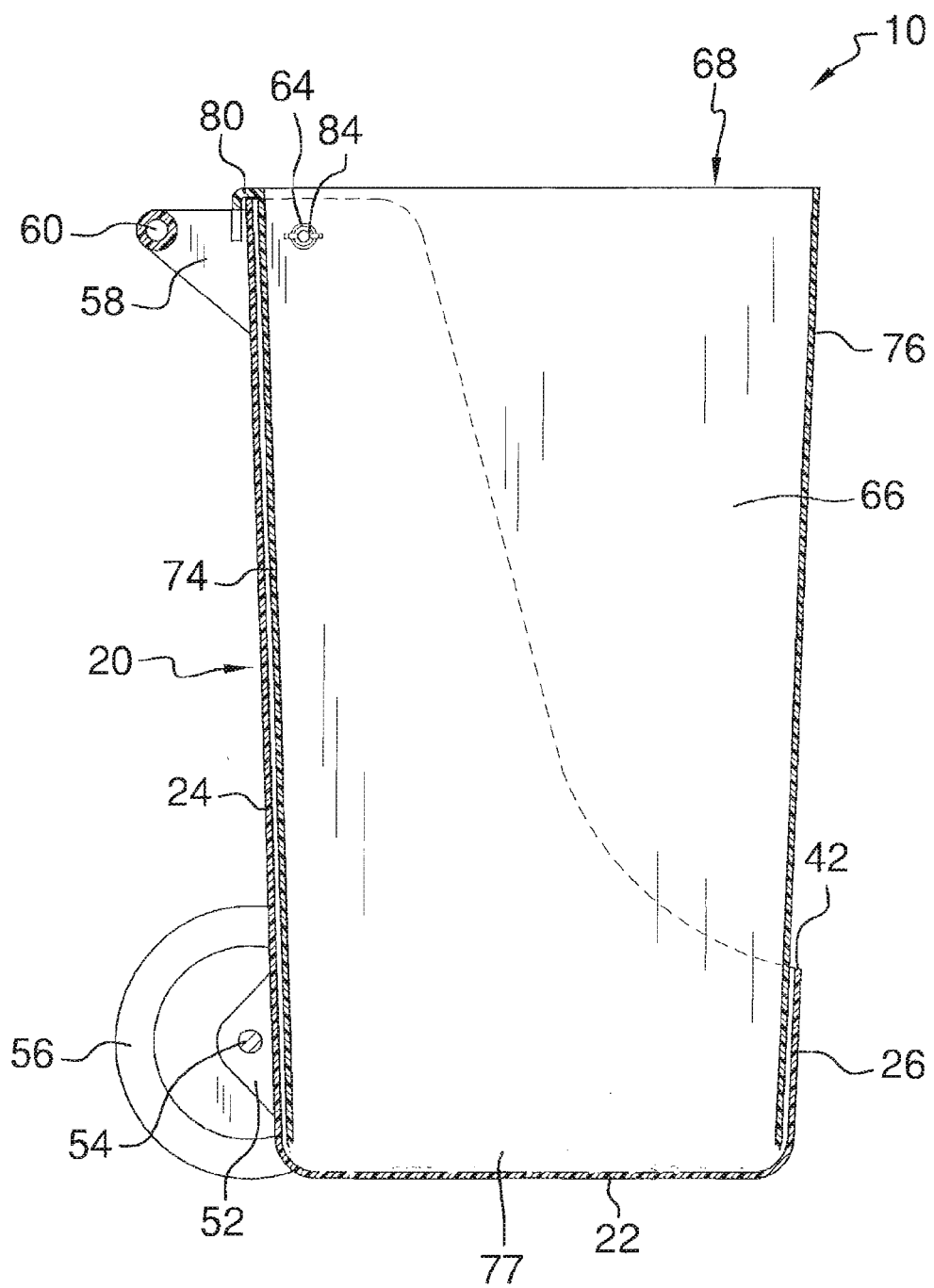
FIG. 4 is a cross section view taken along the line 4-4 of FIG. 2.
Figure 5:
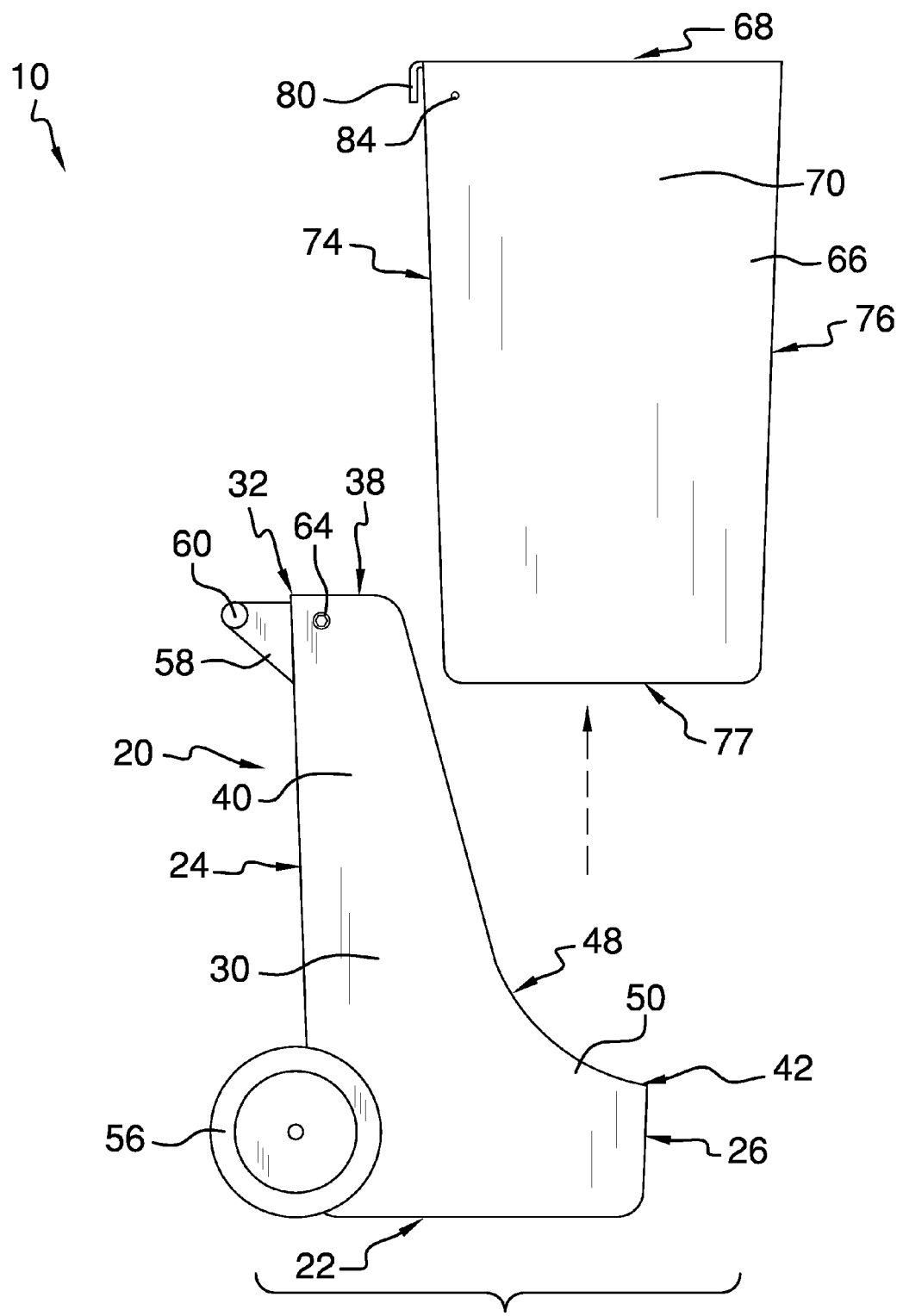
FIG. 5 is an exploded view of a removable cylinder fittable into the wheeled carryall.

With reference now to the drawings, and in particular FIGS. 1 through 6 thereof, example of the instant trash carryall with removable cylinder employing the principles and concepts of the present trash carryall with removable cylinder and generally designated by the reference number 10 will be described.

Referring to FIGS. 1 through 6 a preferred embodiment of the present trash carryall with removable cylinder 10 is illustrated.

The trash carryall with removable cylinder 10 includes a wheeled carryall 20. The wheeled carryall includes a square base 22, a front side 24 extending upwards from the square base, a back side 26 parallel the front side, and a left side 28 extending upwards from the square base. The left side 28 is disposed perpendicular between the front 24 and back 26 sides. A right side 30 is disposed parallel with, and enantiomorphic to, the left side 28.

A horizontal edge 32 is disposed atop the front side 24. This horizontal edge 32 joins with a left side edge 34, the left side edge 34 disposed perpendicular the horizontal edge 32. The left side edge 34 is disposed atop a front portion 36 of the left side 28. A right side edge 38 is disposed enantiomorphic with respect to the left side edge 34, the right side edge 38 disposed atop a forward portion 40 of the right side 30.

A back side edge 42 is disposed in a downward parabola atop the back side 26. A first parabolic edge 44 is disposed from the left side edge 34 down to adjoin the back side edge 42 across a left side cut portion 46. A second parabolic edge 48 is disposed enantiomorphically with respect to the first parabolic edge 44 down across a right side cut portion 50.

A wheel brace 52 is disposed horizontally on the front side 24 proximal to the square base 22. This wheel brace 52 is configured to support an axle 54 therethrough. The axle 54 is disposed through the wheel brace 52 to support a pair of wheels 56, said pair of wheels 56 disposed endwise on the axle 54.

A pair of handle brackets 58 is disposed on the front side 24, the pair of handle brackets 58 extending perpendicularly forwards from the front side 24 proximal to the horizontal edge 32. A handle bar 60 is disposed between, and attached to, the pair of handle brackets 58.

A first hole 62 is centrally disposed in the left side 28 front portion 36 proximal to the left side edge 34. A second hole 64 is disposed in the right side 30 forward portion 40 proximal to the right side edge 38.

The present device 10 also includes a removable cylinder 66. This removable cylinder 66 includes an open top 68, a right wall 70, a left wall 72, a front wall 74, a rear wall 76, and an open bottom 77. An upper edge 78 is disposed around the open top 68. A lip 80 is disposed from the upper edge 78, said lip 80 configured to releasably engage the horizontal edge 32 when the cylinder 66 is inserted into the wheeled carryall 20.

A left hole 82 is disposed within the left wall 72, said left hole 82 configured to be superimposed by the first hole 62 when the cylinder 66 is inserted into the wheeled carryall 20, and a right hole 84 is disposed within the right wall 70, said right hole 84 configured to be superimposed by the second hole 64 when the cylinder 66 is inserted into the wheeled carryall 20. When a pair of extant fasteners, such as a pair of wing nuts (not shown) or a pair of bolts (not shown), is inserted into the first hole 62 and the left hole 82, and the second hole 64 and the right hole 84, the cylinder 66 is secured within the carryall 20. It should be noted that the cylinder 66 open bottom 77 overlies and abuts the carryall 20 square base 22 when the cylinder 66 is inserted into the carryall 20, the carryall 20 back side 26 abutting the cylinder 66 rear wall 76, and the carryall 20 left 28 and right 30 sides enclosing the cylinder left 72 and right 70 walls respectively. The cylinder 66 front wall 74 abuts the carryall 20 front side 24, and the lip 80 engages with the horizontal edge 32.

The cylinder 66 may be removed from the carryall 20 to more easily access trash that has become stored proximal the open bottom 77 of the cylinder 66 or the square base 22 of the carryall 20. When the cylinder 66 is removed, trash that would otherwise be hard to reach is now readily accessible, exposed between the left side cut portion 46 and the right side cut portion 50 of the carryall 20.

Figure 6:
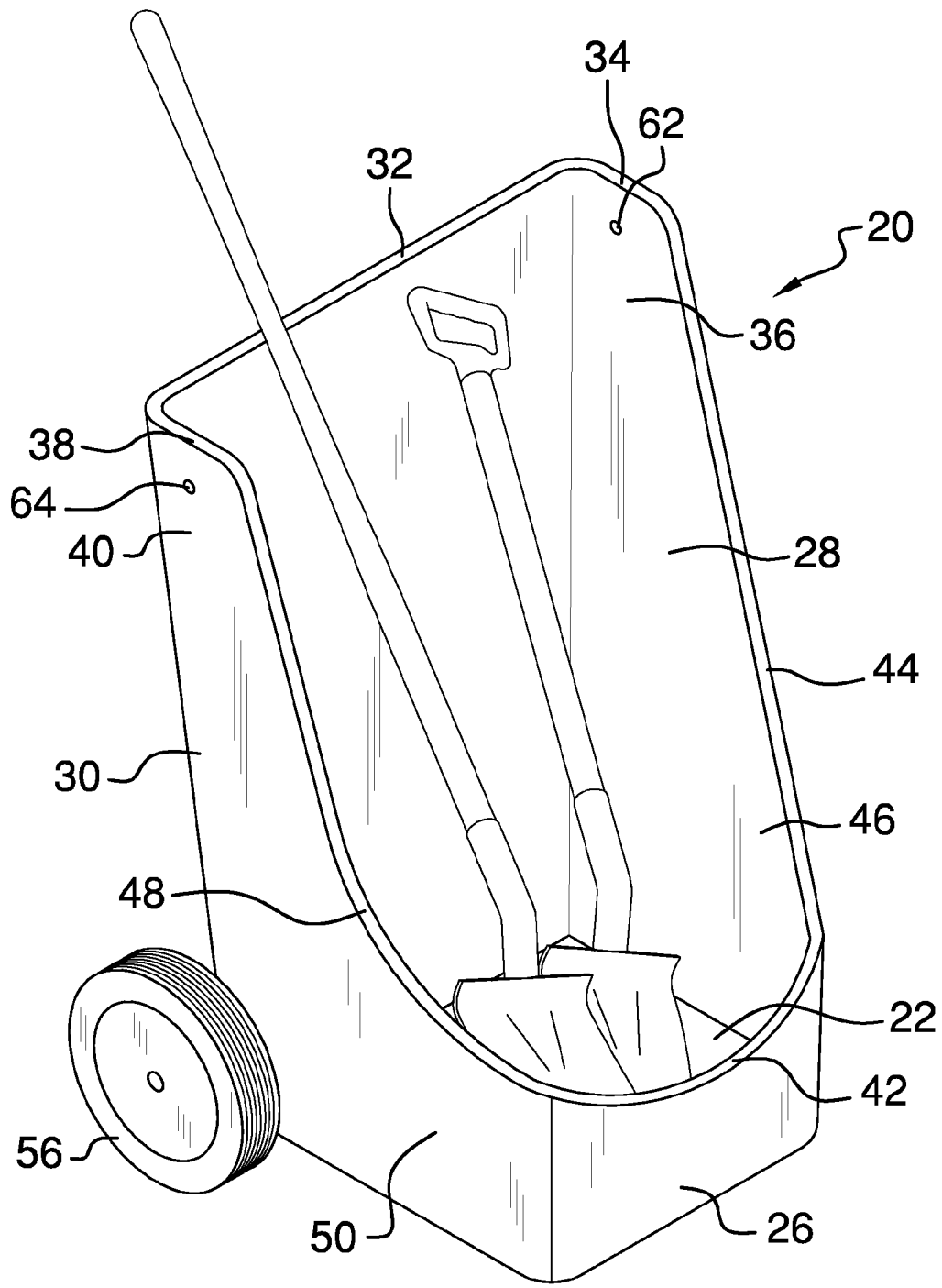
FIG. 6 is an in use view of the carryall.

The carryall 20 may be used independent of the removable cylinder 66 as an all purpose barrow or transporting device (see FIG. 6).

What is claimed is:

1. A trash carryall with removable cylinder comprising:
   a wheeled carryall comprising:
      a square base;
      a front side extending upwards from the square base;
      a back side parallel the front side;
      a left side extending upwards from the square base, the left side disposed perpendicular between the front and rear sides;
      a right side parallel with, and enantiomorphic to, the left side;
      a horizontal edge disposed atop the front side;
      a left side edge disposed perpendicular the horizontal edge, the left side edge extending atop a front portion of the left side;
      a right side edge disposed enantiomorphic with respect to the left side edge, the right side edge extending atop a forward portion of the right side;
      a back side edge disposed in a downward parabola atop the back side;
      a first parabolic edge disposed from the left side edge down to adjoin the back side edge across a left side cut portion;
      a second parabolic edge disposed enantiomorphically with respect to the first parabolic edge down across a right side cut portion;
      a wheel brace disposed horizontally on the front side proximal to the square base;
      an axle disposed through the wheel brace;
      a pair of wheels disposed endwise on the axle;
      a pair of handle brackets disposed on the front side, the pair of handle brackets extending perpendicularly from the front side proximal to the horizontal edge;
      a handle bar disposed between, and attached to, the pair of handle brackets;
      a first hole centrally disposed in the left side front portion proximal to the left side edge;
      a second hole disposed in the right side forward portion proximal to the right side edge;
   a removable cylinder comprising:
      an open top;
      an open bottom;
      a right wall extending upwards from the bottom surface;
      a left wall disposed parallel the right wall;
      a front wall perpendicular the left wall;
      a rear wall disposed parallel the front wall;
      an upper edge disposed around the open top;
      a lip disposed from the front wall upper edge, said lip configured to releasably engage the horizontal edge when the cylinder is inserted into the wheeled carryall;
      a left hole disposed within the left wall, said left hole configured to be superimposed by the first hole when the cylinder is inserted into the wheeled carryall;
      a right hole disposed within the right wall, said right hole configured to be superimposed by the second hole when the cylinder is inserted into the wheeled carryall;
   wherein the wheeled carryall stands upright on the square base, the carryall moveable when tilted by means of the pair of wheels and directable by means of the handle, whereby the cylinder may be transported within the carryall and secured therein by means of the lip and the first and second holes, the cylinder removable from the carryall when preferred for ready access to trash and items stored proximal the base of the carryall.

2. The trash carryall with removable cylinder of claim 1 wherein the pair of holes are configured to receive an extant fastener.

3. The trash carryall with removable cylinder of claim 2 wherein the removable cylinder is made of polymeric material.

4. The trash carryall with removable cylinder of claim 3 wherein the carryall is made of polymeric material.

* * * * *